Nov. 22, 1955  R. H. WHITE  2,724,625
NEEDLE ROLLER THRUST BEARING
Filed Jan. 28, 1955

INVENTOR
ROBERT H. WHITE

BY *Mason, Porter, Diller & Stewart*

ATTORNEYS

United States Patent Office 2,724,625
Patented Nov. 22, 1955

2,724,625

NEEDLE ROLLER THRUST BEARING

Robert H. White, Torrington, Conn., assignor to The Torrington Company, Torrington, Conn., a corporation of Maine Application January 28, 1955, Serial No. 484,644

1 Claim. (Cl. 308—235)

This invention relates to new and useful improvements in a thrust bearing and more particularly in thrust bearings of the needle roller type.

An object of the invention is to provide retainers for the needle rollers of a thrust bearing which are so shaped as to make contact at the outer peripheral portion thereof and have telescoping and interlocking flanges at the inner edge portions thereof.

A further object of the invention is to provide retainers for the needle rollers of a thrust bearing which retainers have flanges at the periphery thereof disposed so as to make face to face contact with each other and flanges at their inner edges which have telescoping and interlocking engagement.

Figure 1:
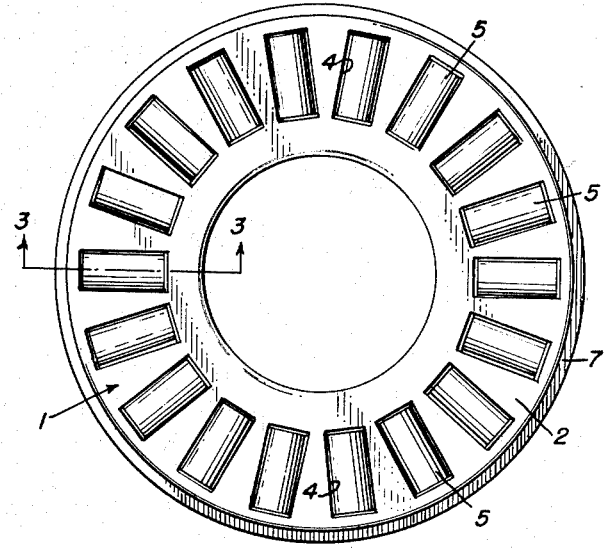
Figure 1 is a plan view on an enlarged scale showing one of the improved needle roller thrust bearings.
Figure 2:
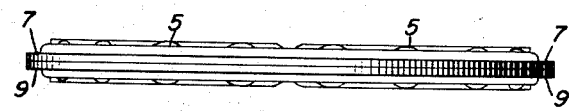
Figure 2 is an edge view of the same.
Figure 3:
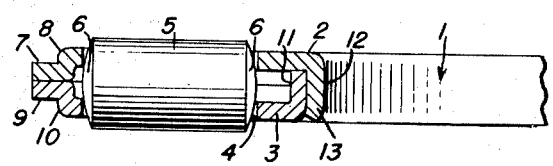
Figure 3 is a sectional view on the line 3, 3 of Figure 1.

The improved thrust bearing includes needle rollers arranged with their axes radial of the bearing and spaced from each other by retainers having openings through which portions of the needle rollers project for engagement with the usual thrust washers. There is a retainer at each side of the needle rollers, each retainer at the periphery thereof has a peripherally projecting flange which is dimensioned so as to make face to face contact with the other when the retainers are in an assembled position. Said retainers are provided at their inner edge portions with inwardly projecting flanges so disposed as to telescope one within the other. The inner flange is spun into interlocking engagement with the base of the outer flange. This will hold the retainers in assembled position. The openings are so dimensioned as to retain the needle rollers in proper radial and spaced relation with each other.

Referring more in detail to the illustrated embodiment of the invention the improved needle roller bearing as a whole is indicated at 1. Said bearing includes retainers 2 and 3 which are generally alike in construction. Each retainer is in annular form and is provided intermediate the inner and outer edge portions thereof with spaced openings 4. These openings are preferably rectangular in shape. Disposed in each opening is a needle roller 5 which is cylindrical in shape and may have rounded ends 6. The rollers and the openings are so dimensioned that when the retainers are in assembled position the rollers project beyond the outer faces of the retainers so as to engage the usual thrust washers when the bearing is in place for use.

The retainer 2 at its periphery is provided with a flange 7. This flange is offset inwardly as indicated at 8. The retainer 3 has a like inwardly offset flange 9 and the inset portion is indicated at 10. This brings the flanges 7 and 9 when the retainer is in assembled position into face to face engagement. The retainer 3 at its inner edge has a laterally projecting flange 11 and the retainer 2 has a laterally projecting flange 12. These flanges are so dimensioned that when the retainers are in assembled position they make telescoping engagement. The flange 11 at its end will contact with the retainer 2 and the flange 12 is extended and spun outwardly as indicated at 13 onto the base of the inner flange 11. This will lock the retainers in their assembled position.

These inset flanges making face to face engagement prevents the needle rollers from being thrown out from between the retainers by centrifugal force in high speed operation which may happen when the rollers are under no load condition, with thrust surfaces separated more than the stock thickness of the retainer. These flanges at the periphery of the retainers give the retainers a certain amount of stiffening property and tend to counteract any waviness that may result from distortion in the hardening process of the retainers. When the two retainers come into contact during assembly they tend to correct each other and thereby eliminate contact between the retainers and the thrust washers which might result in considerable drag.

The retainers are preferably dished slightly so that when the two are brought into assembled position the peripheral flanges contact each other before the centers of the retainers are brought together. Therefore, when the flanges 11 and 12 are brought together and interlocked the flanges 7 and 9 at the periphery of the retainers will be under preload i. e. pressure, which helps to keep them together and also eliminates individual warpage.

It is obvious that minor changes in the details of the construction may be made without departing from the spirit of the invention as set forth in the appended claim.

I claim:

A needle roller thrust bearing comprising needle rollers and two similar ring-shaped resilient retainer members having opposed slots to hold the rollers in radial spaced positions, said retainer members having outwardly projecting peripheral flanges, said retainer members being dished to bring the flanges toward the axial plane of the rollers, and overlapping interlocked flanges projecting laterally from the inner edges of the retainer members to flatten the retainers and hold the outer flanges under compression.

References Cited in the file of this patent

UNITED STATES PATENTS

| 2,548,107 | Horn | Apr. 10, 1951 |

FOREIGN PATENTS

| 509,004 | Great Britain | July 10, 1939 |
| 899,187 | France | May 23, 1945 |